Nov. 6, 1962     L. W. SCHWARTZ     3,062,570

CONNECTOR

Filed Nov. 4, 1959     3 Sheets—Sheet 1

*INVENTOR.*
LEONARD W. SCHWARTZ
BY
Attorney

Nov. 6, 1962 L. W. SCHWARTZ 3,062,570
CONNECTOR

Filed Nov. 4, 1959 3 Sheets-Sheet 2

INVENTOR.
LEONARD W. SCHWARTZ
BY
Attorney

Nov. 6, 1962 L. W. SCHWARTZ 3,062,570
CONNECTOR

Filed Nov. 4, 1959 3 Sheets-Sheet 3

INVENTOR.
LEONARD W. SCHWARTZ
BY
Attorney

United States Patent Office 3,062,570
Patented Nov. 6, 1962

3,062,570
CONNECTOR
Leonard W. Schwartz, Pittsford, N.Y., assignor to Schwartz Metal Company, Inc., Pittsford, N.Y., a corporation of New York
Filed Nov. 4, 1959, Ser. No. 850,951
5 Claims. (Cl. 287—54)

The present invention relates to connectors, and more particularly to members for connecting a plurality of rods or tubes in a predetermined angular relation. The present invention relates both to a method of making these connectors and to the connectors themselves.

Specifically, this invention relates to sheet metal connectors and to a method of making the same, when the connectors are intended for use for connecting a plurality of solid rods or pipes, thereby to form a particular structure.

Heretofore, in fabricating framework, either portable or permanent, such as for metal furniture, playground devices, scaffolding, storage racks, etc. from rods or pipes, it has been necessary either to weld the rods or tubes together in the proper angular relationship; or to use heavy cast iron or machined connectors. Such connectors had to be bolted to the rods or pipes; and in many instances, separate bracing members had to be provided between the rods or pipes to insure the necessary strength. Moreover, in the manufacture of these conventional connectors it was necessary to employ expensive casting and machining methods and in some instances to fabricate each connector from several parts.

One of the objects of the present invention is to provide an improved connector for securing rods or pipes together to build a framework.

Another object of this invention is to provide an improved connector of the type described which can be made from a single piece of sheet metal.

Another object of this invention is to provide an improved connector of the character described which will increase the strength and stability of a framework in which it is used.

Another object of the invention is to provide a connector which will join a plurality of rods or pipes in a framework without bolting or welding the rods or pipes to the connectors.

Another object of the invention is to provide a connector which will permit a framework to be assembled or disassembled quickly and easily without having to bolt or unbolt, weld or cut any parts.

A further object of this invention is to provide an improved method of manufacturing a connector of the character described from a single piece of sheet metal.

Other objects of this invention will become apparent from the specification, the drawings, and the appended claims.

Figure 1:
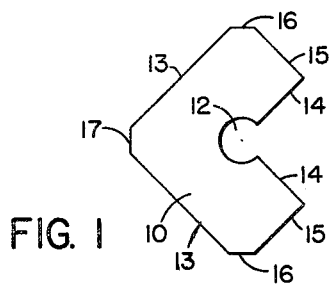
FIG. 1 is a plan view of a sheet metal blank from which a connector can be made in accordance with any of the illustrated embodiments of the invention.
Figure 2:
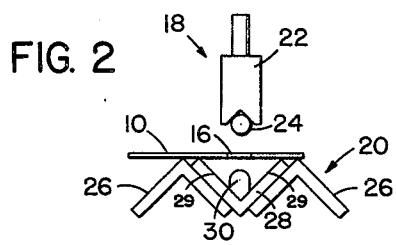
FIG. 2 is an end view of a punch and die used in the process of the present invention for bending the sheet metal blank and showing the punch and die in operative relation to the blank, preparatory to the first step in the formation of the connector.
Figure 6:
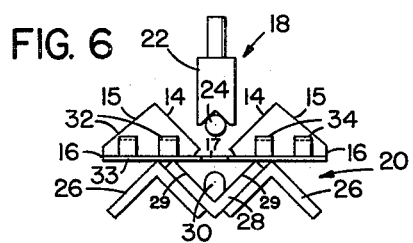
FIG. 6 is an end view of the punch and die with the partially completed blank operatively positioned thereon preparatory to the final step in making a connector according to one embodiment of this invention.
Figure 3:
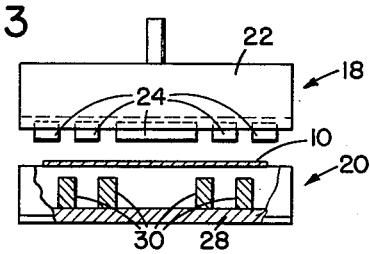
FIG. 3 is a side elevation of the parts shown in FIG. 2.
Figure 7:
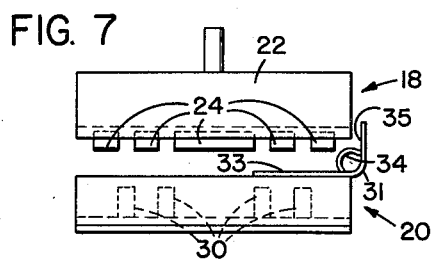
FIG. 7 is a side elevation of the parts shown in FIG. 6.

A connector constructed according to the first-illustrated embodiment of this invention may be used for joining three rods or tubes all of which are perpendicular to one another, such as for making the corner joint of a table or bench frame with a leg depending therefrom. The modified connector of the second illustrated embodiment of the invention is used for connecting a first rod perpendicular to a second rod intermediate the ends of the second rod, or for connecting two rods axially with a third rod which is disposed perpendicular to the first two rods. Both forms of connector herein illustrated are made from a single piece of sheet metal which is formed by two successive punching operations. In the manufacture of the first embodiment of the connector the same punch and die is used for both steps. To make the modified embodiment, a modified punch and die are used for the final step in manufacture.

Referring to the drawings by numerals of reference, 10 denotes a sheet metal blank (FIG. 1) which may be used in making both embodiments of the connectors illustrated herein. The blank 10 has a central opening 12, two edges 13 which are perpendicular to one another, two edges 15 which are perpendicular to the respective edges 13 and two edges 14 which are perpendicular to the edges 15, and intersect the opening 12. The blank 10 has two diagonally-disposed chamfered corners 16 and an intermediate chamfered corner 17.

A punch 18 and die 20 are used to perform the first step in forming the blank 10 to make a connector according to either illustrated embodiment of the invention. The punch 18 comprises a body member 22 which has a plurality of spaced axially-aligned cylindrical bosses 24 attached to its bottom face. The die 20 comprises a pair of spaced, parallel inverted supporting angle irons 26 and a third erected angle iron 28 fastened between the parts 26. Fastened in the part 28 at its vertex formed by the juncture of its sides 29 are a plurality of bosses or cylindrical members 30 which are so spaced that these bosses 30 will fit between, intermesh with, the bosses 24 when the punch is pressed into the die.

Figure 4:
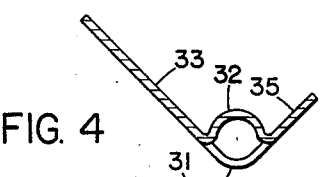
FIG. 4 is an end view showing the blank partially formed by the punch and die and in the first step of the process.
Figure 8:
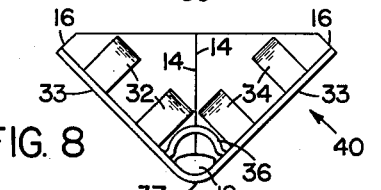
FIG. 8 is a plan view of the completed connector constructed according to this embodiment of the invention.
Figure 5:
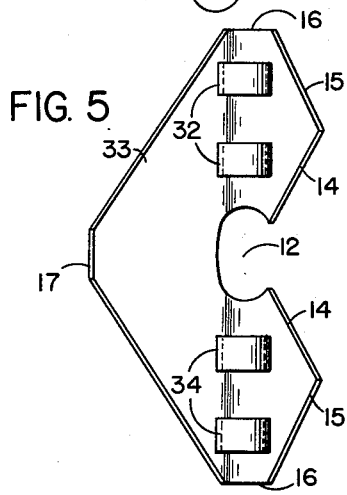
FIG. 5 is a plan view of the partially completed blank.
Figure 9:
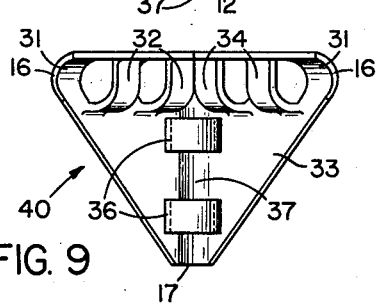
FIG. 9 is an inside elevation of this connector.

In performing the first step in making the connectors the blank 10 is laid flat across the die 20 so that the chamfered edges 16 are axially aligned with the bosses 30. The punch 18, which may be connected to the ram of a conventional punch press, is then brought down on the plate 10 to form it in the die 20. The cylindrical bosses 24 of the punch shear the metal when they enter the spaces between the bosses 30 of the die, and simultaneously bend the blank 10 so that its sides 33 and 35 are perpendicular to each other (FIG. 4), and so that an arcuate fillet 31 is formed at the juncture of the sides 33 and 35. Simultaneously that portion of the blank 10, which engages the cylindrical bosses 30 when the punch 18 and die are brought together is bent upwardly forming a plurality of spaced, arcuate straps 32 and 34. The pair of straps 32 are aligned on one side of the opening 12 with the pair of straps 34 on the other side of this opening. The punch 18 is then retracted.

The second and final step in making one type of connector as illustrated in FIGS. 6 through 9, is accomplished with the same punch and die 18 and 20 as used in the first step. In this second step, the bent blank is positioned on the die 20 so that its chamfered edge 17 is axially aligned with the bosses 24 and 30, respectively, of the punch and die, and so that the side 33 of the blank rests on the top edges of the die. When the punch 18 is pressed down, the bosses 24 bend the side 33 at a ninety degree angle to form a rounded fillet 37 (FIG. 8) and the metal between the bosses 24 and 30 is simultaneously sheared and bent upwardly to form a pair of arcuate straps 36 whose axis extends in a direction at right angles to the axes of the straps 32 and 34. The bending of its side 33 causes the edges 14 of the blank 10 to abut against each other. The punch 18 is retracted, and the completed connector denoted at 40 is removed from the die.

In summary and referring to the connector 40, the first step in the operation simultaneously forms the straps 32 and 34 and bends the blank 10 to have sides 33 and 35 perpendicular to each other, and the second and final step simultaneously forms the straps 36 and bends the blank 10 transversely of the bend 31 thus forming a connector having three sides which are perpendicular to each other. Two pairs of straps 32 and 34, respectively, are formed at the junctures of one of the sides with the other two sides and the pair of straps 36 is formed at the juncture of said other two sides with one another.

Figure 10:
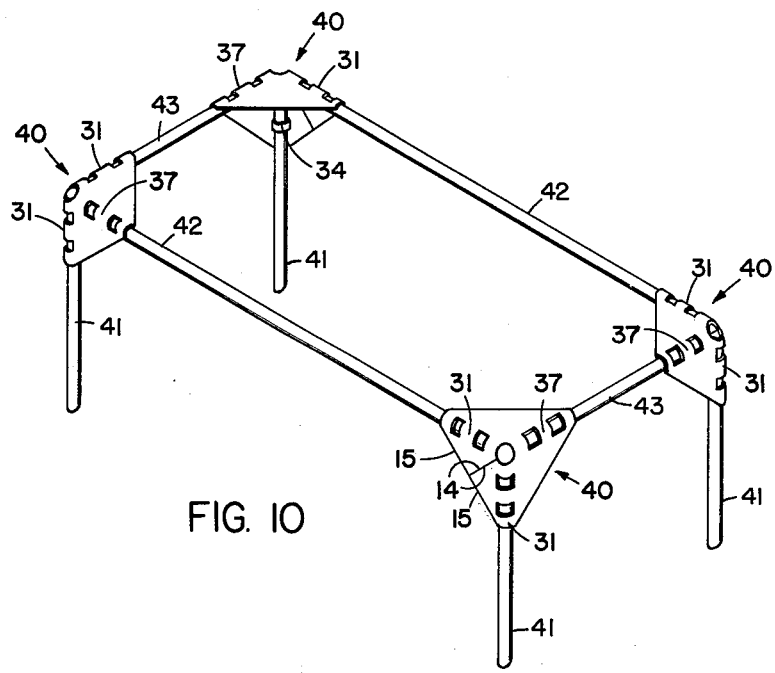
FIG. 10 is a view in perspective of a framework illustrating one application of this connector.
Figure 11:
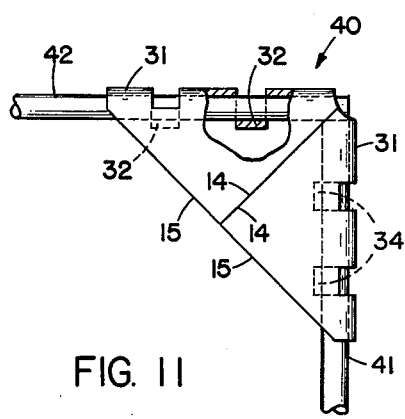
FIG. 11 is a fragmentary side elevation showing one corner of this framework on an enlarged scale with parts broken away and further illustrating the application of this connector.

To construct a framework such as shown in FIGS. 10 and 11, for instance, with the connectors, vertical disposed rods or pipes 41, for instance, can be shoved into the straps 34, for instance, of four of the connectors, to form the legs or uprights of the framework, and other rods or pipes 42 can be shoved into aligned straps 36 of pairs of connectors to form longitudinal sides of the framework, and still other pipes or rods 43 can be shoved into aligned straps 32 of pairs of connectors to form lateral sides of the framework. The rods or pipes are preferably selected of approximately the same diameter as the straps so as to fit snugly therein so that the whole framework will be held together by friction without need for holes or screws. This also permits quick disassembly of the framework.

Figure 12:
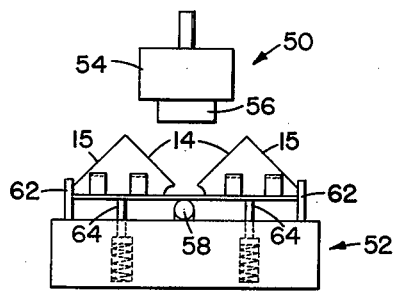
FIG. 12 is a side elevation of a modified punch and die and having a partially-completed sheet metal blank, similar to that illustrated in FIGS. 4 and 5, positioned between them preparatory to the final step in making a connector in accordance with another embodiment of this invention.
Figure 14:
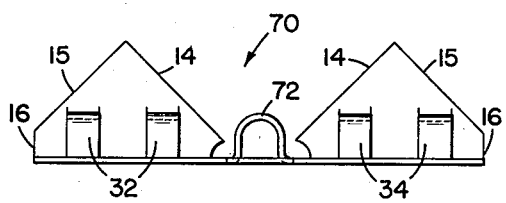
FIG. 14 is a side view of the modified connector.
Figure 13:
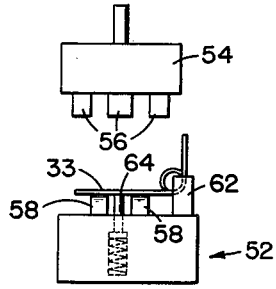
FIG. 13 is an end view of the parts shown in FIG. 12.
Figure 15:
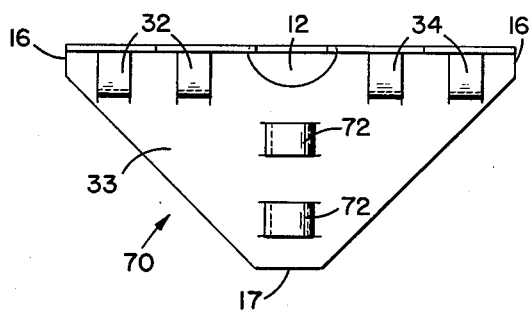
FIG. 15 is a plan view of the modified connector.

A modified form of connecting member 70 (FIGS. 14 and 15) may also be made from a sheet metal blank such as denoted at 10 in FIG. 1. The first step in the manufacture of such a modified connector is identical to the first step for making the connecting member 40. The second and final step is, however, performed by a punch and die 50 and 52 (FIGS. 12 and 13). The punch 50 has a holding member 54 to which is attached three spaced bosses 56 which are rectangular in cross section. The die 52 comprises a flat bed upon which is attached two spaced cylindrical bosses 58 which are disposed to fit between the bosses 56 when the punch 50 is brought down on the die 52. A pair of guide members 62 are attached to the bed 52 for aiding in positioning the bent blank. The bent blank is supported above the bed 52 by a pair of spaced spring loaded pins 64 which extend upwardly between the guide members 62.

To form the connecting member hereinafter referred to as 70, the bent blank is positioned on the pin 64 between the guide members 62, so that the chamfered edges 16 engage against the guide members 62 and the edges 15 and 14 point upwardly. The cylindrical bosses 58 extend prependicular to the fillet 31 so that they are aligned with the chamfered edge 17 and the now deformed opening 12 of the blank. When the punch 50 is brought down upon the blank, the bosses 56 and 58 cooperate to shear the blank and form the arcuate straps 72. Thus, the connecting member 70 has straps 72 which extend perpendicular to the straps 32 and 34 to provide a T connection.

Figure 16:
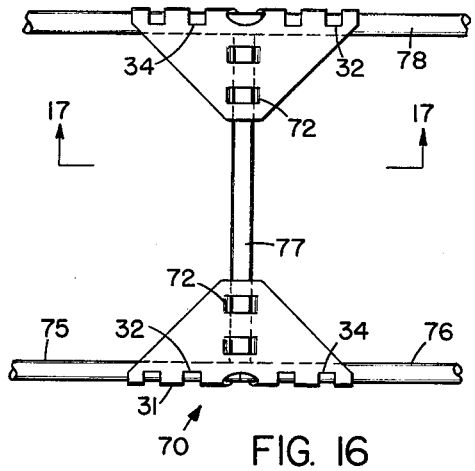
FIG. 16 is a fragmentary plan view of a framework illustrating the application of the modified connector.
Figure 17:
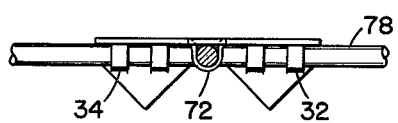
FIG. 17 is a fragmentary side elevation taken on line 17—17 of FIG. 16 and looking in the direction of the arrows.

When using the conectors 70 in making a framework (FIGS. 16 and 17) two rods or tubes 75 and 76, respectively, may, for instance, be joined end to end by inserting rod 75 into the straps 34, and inserting the other rod 76 into the straps 32. A third rod 77 is inserted between the straps 72 and the side 33 of the connector 70 perpendicular to the rods 75 and 76. Also one rod, such as 78, or a pair of rods, may be inserted through both the plurality of straps 32 and 34, and the rod 77 may be connected perpendicular to the one rod 78 through the straps 72.

Thus, it is seen that I have provided improved connecting members each of which is completely formed from a single sheet metal blank in just two operations. Furthermore, I have provided a connector which inherently strengthens the framework by enclosing the rods which it connects for an appreciable distance from their ends. Moreover, I have provided an improved connector wherein the framework may be easily assembled and disassembled. The framework can be used if desired to support shelving or racks, and if desired a covering such as wood or sheet metal may be easily attached to the framework by bolting or otherwise fastening it to the flat sides of the connecting members.

It is obvious that the connecting members herein may be bent so that the sides form angles with each other that are other than perpendicular to connect rods or tubes in practically any angular relation.

While the invention has been described in connection with two specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A connector for holding three rods angularly disposed to one another, any two of which lie in the same plane, said connector comprising a single sheet of sheet metal having three sides, any two of which are angularly connected to one another by an arcuate juncture, a plurality of aligned, axially spaced arcuate straps struck up from said sheet at each of said junctures coaxially of the respective juncture, each of said straps extending across the respective juncture and merging at its opposite ends into the sides defining the respective juncture, said junctures and their respective straps essentially defining slotted tubes in which said rods are adapted to be held, the axes of any two of said tubes being coplanar and angularly disposed with respect to one another.

2. The method of making a connector for elongate rods from a single sheet metal blank comprising the steps of first bending said blank to form two sides merging at an angle to each other in a first bend and simultaneously striking up from said blank at said first bend a first plurality of axially-spaced, aligned straps at the juncture of and extending between said two sides, and secondly bending one of said sides transversely of said first bend to form a second bend extending at an angle to said first bend and to dispose the straps which are at one side of the second bend at an angle to the straps which are at the other side of said second bend, whereby to form two groups of straps from said first plurality of straps, and simultaneously with said second bending striking up from said one side coaxially of the second bend, a second plurality of axially-spaced, aligned straps at and extending across said second bend.

3. A method of making a connector for elongate rods from a single sheet metal blank comprising the steps of bending said blank to form two sides disposed angularly with respect to one another and merging in a bend, simultaneously with said bending striking up from said blank coaxially of said bend a plurality of axially-spaced, aligned straps extending between said two sides, and then striking up from at least one of said sides a further plurality of axially-spaced, aligned straps having their axis coplanar with and angularly disposed with respect to the axis of at least some of the first-formed straps.

4. A method of making a connector for elongate rods from a single sheet metal blank comprising the steps of bending said blank to form two sides disposed angularly with respect to one another and merging at the bend, simultaneously with said bending striking up from said blank at said bend a plurality of aligned straps spaced longitudinally of the bend and extending between said two sides, and thereafter striking up from one of said sides a further plurality of straps which are aligned and spaced longitudinally and which have their longitudinal center line angularly disposed with respect to the longitudinal center line of the first-formed straps, said straps constituting sockets to receive the rods which are to be connected by said connector.

5. A method of making a connector for elongate rods from a single sheet metal blank of generally rectangular shape which has a notch therein that extends inwardly from one corner of said blank to approximately the center of said blank, comprising the steps of bending said blank along a line extending transverse to a line bisecting said notch to form a first bend in said blank while maintaining the sides of said notch in their original plane, and simultaneously with said bending striking up from said blank, coaxially of said first bend, a first plurality of axially spaced, aligned straps, and then further bending said blank transversely of said first bend along a line extending through said one corner at right angles to said first bend and to said original plane and extending between two adjacent straps at approximately the longitudinal center of said first plurality of straps to form a second bend and to urge the sides of said notch into engagement with one another so that the straps of said first plurality which are on opposite sides of said center are disposed along axes which intersect each other at right angles, and simultaneously with the second bending, striking up from said blank coaxially of said second bend a second plurality of axially spaced, aligned straps.

References Cited in the file of this patent

UNITED STATES PATENTS

| 1,393,842 | Slater | Oct. 18, 1921 |
| 1,434,861 | Vancl | Nov. 7, 1922 |
| 2,176,161 | Vogel | Oct. 17, 1939 |
| 2,520,998 | Cella | Sept. 5, 1950 |

FOREIGN PATENTS

| 744,294 | Great Britain | Feb. 1, 1956 |